J. N. BURTON.
PIE TRIMMER AND CRIMPER.
APPLICATION FILED MAR. 27, 1920.

1,356,692.

Patented Oct. 26, 1920.

UNITED STATES PATENT OFFICE.

JOHN N. BURTON, OF GREAT KILLS, NEW YORK.

PIE TRIMMER AND CRIMPER.

1,356,692.  Specification of Letters Patent.  Patented Oct. 26, 1920.

Application filed March 27, 1920. Serial No. 369,306.

*To all whom it may concern:*

Be it known that I, JOHN N. BURTON, a citizen of the United States, residing at Great Kills, Staten Island, in the county of Richmond and State of New York, have invented certain new and useful Improvements in Pie Trimmers and Crimpers, of which the following is a specification.

This invention relates to a pie trimmer and crimper, the object of the invention being to provide a very simple implement of this character, which can be used by either a right or left handed person, and which is inexpensive to make and sell and is very efficient in use.

Figure 1:
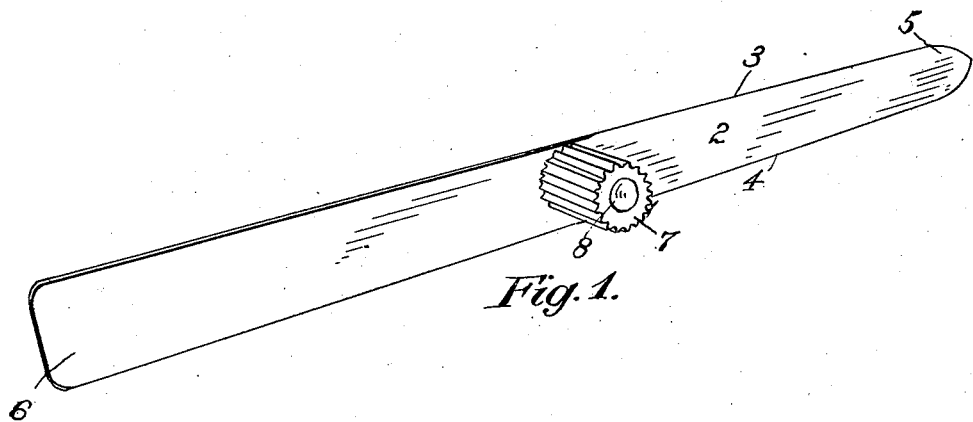
Figure 2:
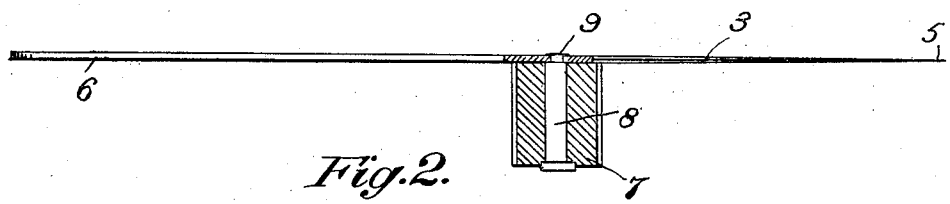
Figure 3:
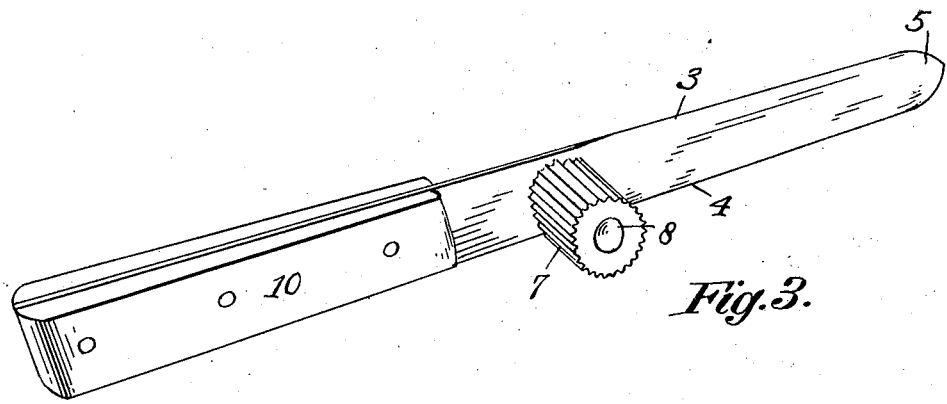

In the drawings accompanying and forming part of this specification, Figure 1 is a perspective view of this improved pie trimmer and crimper. Fig. 2 is a partially horizontal sectional view thereof, and Fig. 3 is a perspective view of the implement shown in Fig. 1, having a wooden or other form of handle attached thereto.

Similar characters of reference indicate corresponding parts in the several figures of the drawings.

This improved pie trimmer and crimper comprises a knife blade 2 sharpened along both of its edges 3 and 4 terminating in a relatively sharp point 5. This blade is provided with a handle portion 6 integral with the blade, and extending in the same direction or plane of the blade. Adjacent to the inner end of the handle portion is located a fluted crimping roller 7, projecting from the side of the implement and the diameter of which does not exceed the width of the blade at its point of connection therewith.

This fluted roller 7 is suitably supported by a rivet or spindle 8, riveted through the implement as at 9 and upon which spindle the fluted roller may rotate.

In the form shown in Fig. 3 the handle portion is provided with a wooden or other form of handle 10.

From the foregoing it will be observed that I have provided a very simple pie trimmer and crimper in which the crimper roll is located at one side of the blade, but between the two sharpened edges thereof, so that it is out of the way should it be desired to use the point only of the blade or the knife in a substantially perpendicular position, but nevertheless so located in such position relatively to the two sharpened edges of the blade that either a right- or a left-handed person can, by holding the implement in the proper position,—that is to say in a more nearly horizontal one, both trim and crimp the dough of a pie at the same time, thus saving considerable time in the making of a number of pies.

Therefore not only is the knife so constructed that it may be used by either a right or a left-handed person, but because of its simple, and inexpensive construction comprising but three parts in the form shown in Fig. 1, it can be manufactured at very low cost and sold for a very small amount. And as the pie can be both trimmed and crimped at the same time by holding the knife in the proper position, it follows that one-half of the time of performing these operations when performed separately is saved, and in the manufacture of a large number of pies this item of saving in time and labor would be considerable.

The various details may be more or less changed without departing from the spirit or scope of the present improvement.

I claim as my invention:

1. A combination tool comprising a two-edged blade provided with a point and a handle, and a fluted roll rotatably mounted on the blade intermediate the handle and point.

2. A combination tool comprising a two-edged blade, and a corrugated roll turnably and directly mounted on the blade intermediate its ends.

3. The herein described combination tool comprising a flat double-edged blade terminating in a point at one end and a handle at the other end in line with said blade, a pivot riveted through the blade between the edges thereof and near the hilt and having a head at its opposite end, and a rotatable fluted roller carried by said pivot and maintained in position against endwise play by the blade at one end and by the head of the pivot at the opposite end substantially as described.

4. A combination pie trimmer and crimper comprising a double-edged blade having a crimping roll rotatably mounted upon the blade between the line of the two sharpened edges thereof in position to enable the blade and crimper to be used simultaneously or permit the blade to be used independently thereof.

Signed at 1822 Park Row Bldg., New York city, county and State of New York, March 26, 1920.

JOHN N. BURTON.